(12) United States Patent
Rosario

(10) Patent No.: US 8,322,899 B1
(45) Date of Patent: Dec. 4, 2012

(54) LED ACCESSORY SYSTEM

(76) Inventor: Israel Rosario, W. Hollywood, FL (US)

( * ) Notice: Subject to any disclaimer, the term of this patent is extended or adjusted under 35 U.S.C. 154(b) by 147 days.

(21) Appl. No.: 12/592,229

(22) Filed: Nov. 20, 2009

(51) Int. Cl.
*B60Q 1/00* (2006.01)

(52) U.S. Cl. .......................................... 362/485; 362/540

(58) Field of Classification Search .......... 362/540–545, 362/497–499, 485
See application file for complete search history.

(56) References Cited

U.S. PATENT DOCUMENTS

| | | | |
|---|---|---|---|
| 5,260,858 A * | 11/1993 | Maglica | 362/205 |
| 5,434,552 A | 7/1995 | Ems | |
| 5,629,105 A * | 5/1997 | Matthews | 429/97 |
| 6,140,919 A * | 10/2000 | Buchanan | 340/468 |
| 6,142,502 A * | 11/2000 | Breslin | 280/506 |
| 6,178,650 B1 | 1/2001 | Thibodeaux | |
| 6,302,567 B1 * | 10/2001 | Gamble, Sr. | 362/505 |
| 6,379,028 B1 * | 4/2002 | Crouse et al. | 362/485 |
| 6,409,367 B1 * | 6/2002 | Pratt | 362/505 |
| 6,412,202 B1 * | 7/2002 | Oswood | 40/591 |
| 6,734,792 B1 * | 5/2004 | McElveen | 340/468 |
| 6,783,266 B2 * | 8/2004 | McCoy et al. | 362/485 |
| 6,977,584 B2 * | 12/2005 | Milliken | 340/468 |
| 7,008,088 B2 * | 3/2006 | Pisciotti | 362/485 |
| 7,032,920 B1 | 4/2006 | Peng | |
| 7,291,017 B1 | 11/2007 | Fain | |
| 7,429,121 B1 * | 9/2008 | Huang | 362/485 |
| 2006/0218835 A1 * | 10/2006 | Chafin | 40/611.05 |

* cited by examiner

*Primary Examiner* — Julie Shallenberger

(57) ABSTRACT

A base member has a top and a bottom with laterally spaced sides, a generally planar front face, and a generally planar rear face. A battery extends through a cylindrical hole through the base member. A lens cap is threadedly coupled to the rear face of the base member rearwardly of the hole to create a light chamber rearward of the base member. A battery switch is threadedly coupled to the base member. A printed circuit board with rearward facing LEDs is within the chamber. The LEDs are adapted to be turned on and off through the energizing and de-energizing of the battery by the switch.

3 Claims, 9 Drawing Sheets

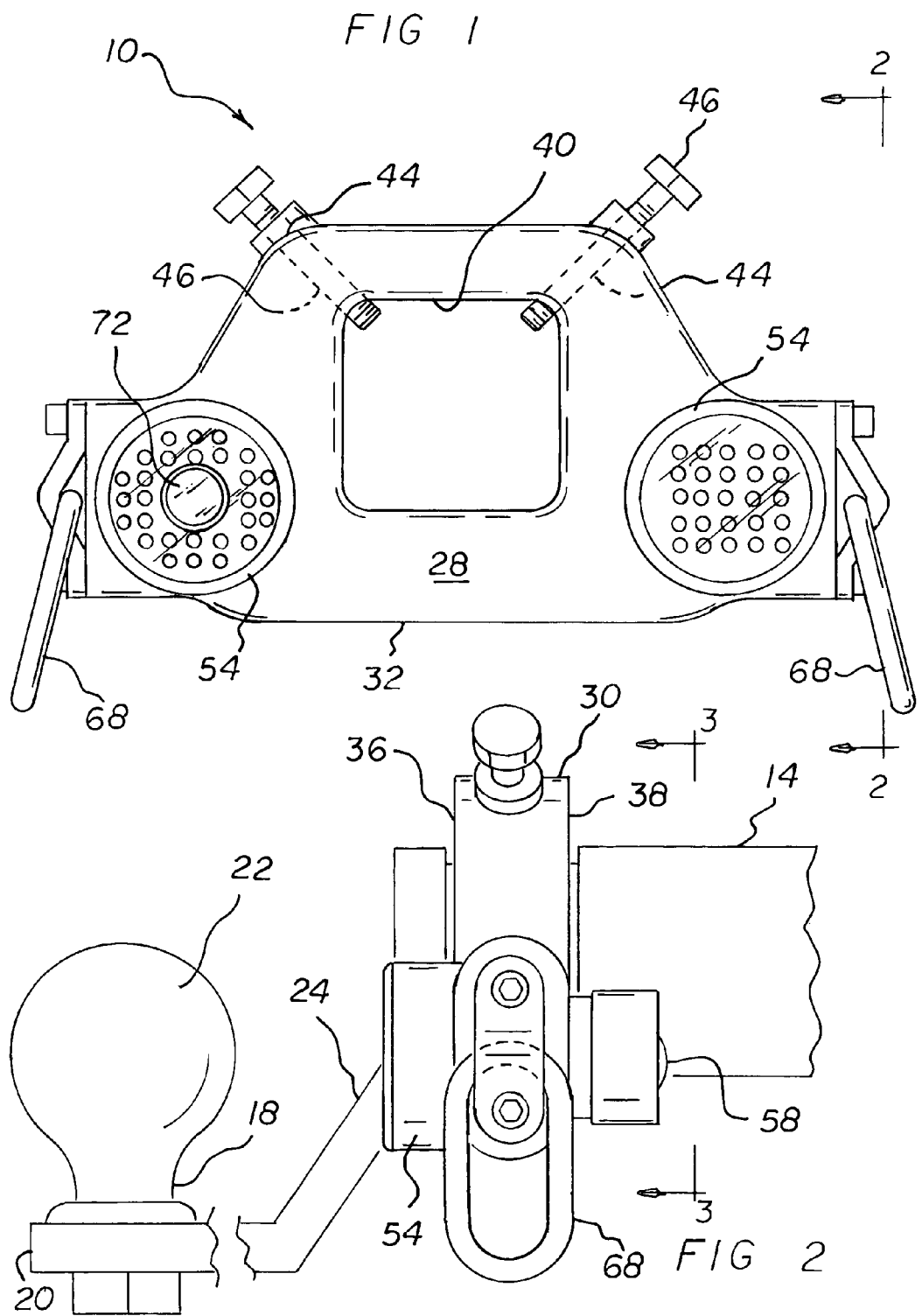

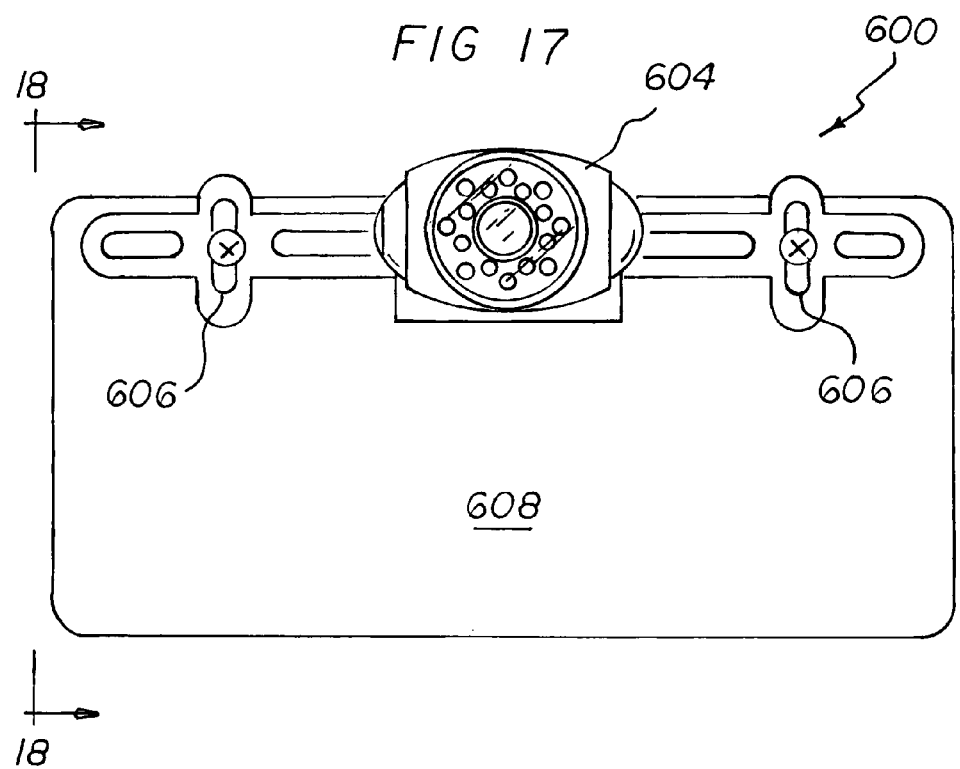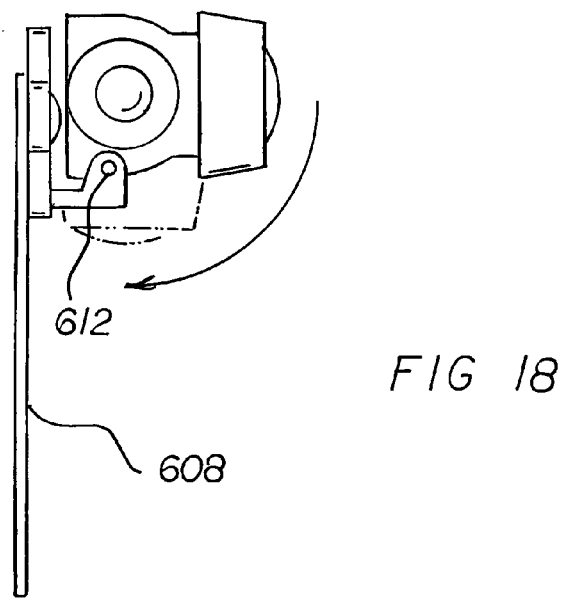

LED ACCESSORY SYSTEM

BACKGROUND OF THE INVENTION

1. Field of the Invention

The present invention relates to an LED accessory system and more particularly pertains to illuminating a hitch ball area of a towing vehicle to facilitate coupling a trailer to the vehicle in a safe, convenient and economical manner.

2. Description of the Prior Art

The use of towing accessory systems of known designs and configurations is known in the prior art. More specifically, towing accessory systems of known designs and configurations previously devised and utilized for the purpose of illuminating the hitch ball area of a vehicle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,434,552 issued Jul. 18, 1995 to Ems relates to a Trailer Hitch Security System with Separate and Selectively Set Loose Connection and Theft Prevention Alarms. U.S. Pat. No. 6,178,650 issued Jan. 30, 2001 to Thibodeaux relates to a Trailer Hitch Protection System. U.S. Pat. No. 7,032,920 issued Apr. 25, 2006 to Peng relates to an Embellished Vehicle Trailer Hitch Ball Assembly. Lastly, U.S. Pat. No. 7,291,017 issued Nov. 6, 2007 to Fain relates to a Power Interface Device for Trailer Hitches.

While these devices fulfill their respective, particular objectives and requirements, the aforementioned patents do not describe an LED accessory system that allows illuminating a hitch ball area of a towing vehicle to facilitate coupling a trailer to the vehicle in a safe, convenient and economical manner.

In this respect, the LED accessory system according to the present invention substantially departs from the conventional concepts and designs of the prior art, and in doing so provides an apparatus primarily developed for the purpose of illuminating a hitch ball area of a towing vehicle to facilitate coupling a trailer to the vehicle in a safe, convenient and economical manner.

Therefore, it can be appreciated that there exists a continuing need for a new and improved LED accessory system which can be used for illuminating a hitch ball area of a towing vehicle to facilitate coupling a trailer to the vehicle in a safe, convenient and economical manner. In this regard, the present invention substantially fulfills this need.

SUMMARY OF THE INVENTION

In view of the foregoing disadvantages inherent in the known types of towing accessory systems of known designs and configurations now present in the prior art, the present invention provides an improved LED accessory system. As such, the general purpose of the present invention, which will be described subsequently in greater detail, is to provide a new and improved LED accessory system and method which has all the advantages of the prior art and none of the disadvantages.

To attain this, the present invention essentially comprises a horizontally disposed tubular reception member having a square cross sectional configuration with an exterior surface and a rearwardly extending interior surface.

Next provided is a hitch ball member having a rearward end with an upstanding ball for receiving a trailer to be towed. The hitch ball member has a forward end with a forwardly extending projection positionable in the interior surface of the reception member.

A base member is next provided. The base member has a top and a bottom with laterally spaced sides. The base member has a generally planar front face and a generally planar rear face. A square opening is provided through the base member. The opening is slidably received by the exterior surface of the tubular reception member with the rear face facing rearwardly toward the upstanding ball.

Next provided are two angularly disposed threaded apertures extending from the top of the base member to the opening. A locking bolt is threadedly received within each threaded aperture to selectively secure and release the base member with respect to the tubular reception member.

A cylindrical hole extends through each side of the base member. A battery extends through each hole. A lens cap is threadedly coupled to the rear face of the base member rearwardly of each hole to create a light chamber rearward of each side of the base member. A battery switch is threadedly coupled to the front face of the base member forwardly of each hole to energize and de-energize the battery upon depressing the switch.

Next a printed circuit board is provided. The printed circuit board has rearward facing LEDs. Light emitting diodes are commonly referred to as LEDs. The LEDs are in a square grid within the chamber. The LEDs are adapted to be turned on and off through the energizing and de-energizing of the battery upon the pressing of the switch. The LEDs are at an elevation essentially equal to the ball for maximizing illumination.

Additionally, in the preferred embodiment, a laterally positioned link is provided. The laterally positioned link extends laterally from and is pivotably secured to each side of the base member for supplemental attachment of the trailer.

Lastly provided is a television camera within one of the chambers operatively coupled to the battery.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved LED accessory system which has all of the advantages of the prior art towing accessory systems of known designs and configurations and none of the disadvantages.

It is another object of the present invention to provide a new and improved LED accessory system which may be easily and efficiently manufactured and marketed.

It is further object of the present invention to provide a new and improved LED accessory system which is of durable and reliable constructions.

An even further object of the present invention is to provide a new and improved LED accessory system which is susceptible of a low cost of manufacture with regard to both materials and labor, and which accordingly is then susceptible of low prices of sale to the consuming public, thereby making such LED accessory system economically available to the buying public.

Even still another object of the present invention is to provide an LED accessory system for illuminating a hitch ball area of a towing vehicle to facilitate coupling a trailer to the vehicle in a safe, convenient and economical manner.

Lastly, it is an object of the present invention to provide a new and improved LED accessory system having a base member with a top and a bottom with laterally spaced sides, a generally planar front face, and a generally planar rear face. A battery extends through a cylindrical hole through the base member. A lens cap is threadedly coupled to the rear face of the base member rearwardly of the hole to create a light chamber rearward of the base member. A battery switch is threadedly coupled to the base member. A printed circuit board with rearward facing LEDs is within the chamber. The LEDs are adapted to be turned on and off through the energizing and de-energizing of the battery by the switch.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a LED towing accessory system constructed in accordance with the principles of the present invention.

FIG. 2 is a side elevational view taken along line 2-2 of FIG. 1.

FIGS. 17 and 18 are a front elevational view of a sixth alternate embodiment of the invention and a side elevational view taken along line 18-18 of FIG. 17.

The same reference numerals refer to the same parts throughout the various Figures.

DESCRIPTION OF THE PREFERRED EMBODIMENT

Figure 3:
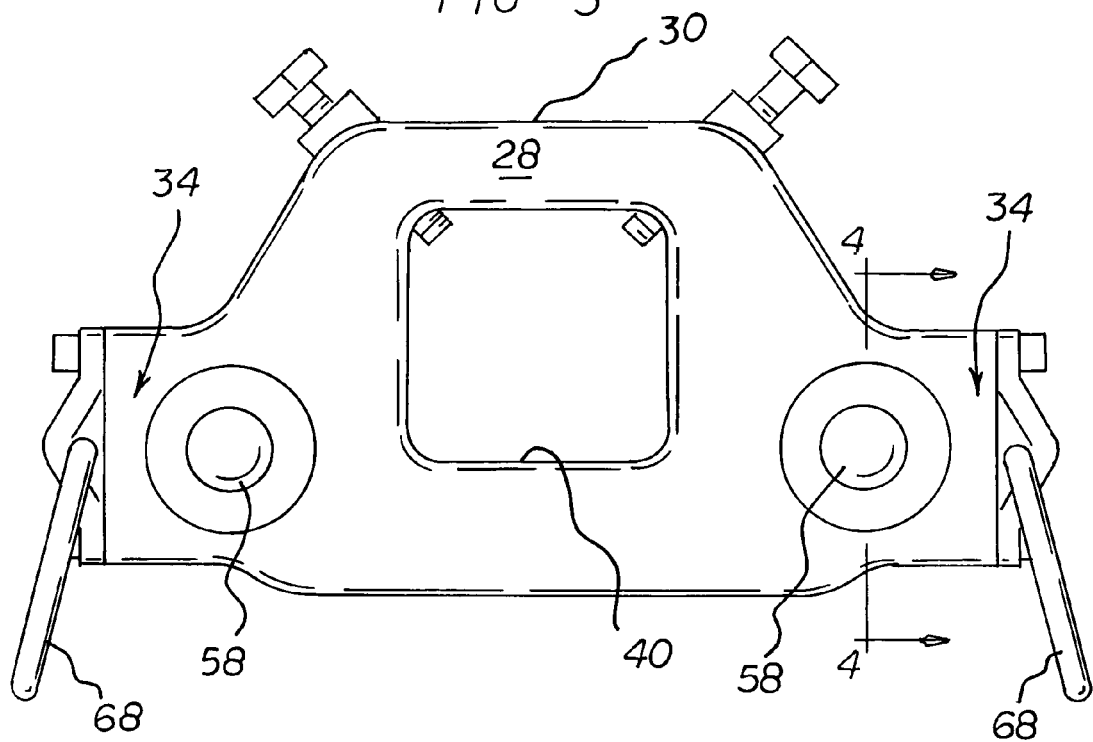
FIG. 3 is a rear elevational view taken along line 3-3 of FIG. 2.
Figure 4:
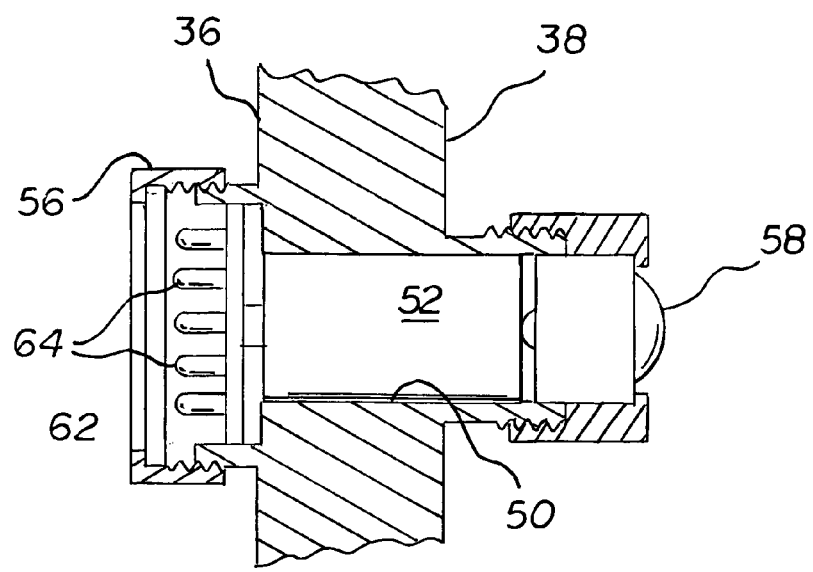
FIG. 4 is a cross sectional view taken along line 4-4 of FIG. 3.

With reference now to the drawings, and in particular to FIG. 1 thereof, the preferred embodiment of the new and improved LED accessory system embodying the principles and concepts of the present invention and generally designated by the reference numeral 10 will be described.

The present invention, the LED accessory system 10 is comprised of a plurality of components. Such components in their broadest context include a base member, a cylindrical hole through the base member, and a printed circuit board. Such components are individually configured and correlated with respect to each other so as to attain the desired objective.

In the preferred embodiment of the LED towing accessory system 10 for illuminating a hitch ball area of a towing vehicle to facilitate coupling a trailer to the towing vehicle, a horizontally disposed tubular reception member 14 is first provided. The reception member has a square cross sectional configuration with an exterior surface and a rearwardly extending interior surface.

Next provided is a hitch ball member 18 having a rearward end 20 with an upstanding ball 22 for receiving a trailer to be towed. The hitch ball member hasg a forward end 24 with a forwardly extending projection positionable in the interior surface of the reception member.

A base member 28 is next provided. The base member has a top 30 and a bottom 32 with laterally spaced sides 34. The base member has a generally planar front face 36 and a generally planar rear face 38. A square opening 40 is provided through the base member. The opening is slidably received by the exterior surface of the tubular reception member with the rear face facing rearwardly toward the upstanding ball.

Next provided are two angularly disposed threaded apertures 44 extending from the top of the base member to the opening. A locking bolt 46 is threadedly received within each threaded aperture to selectively secure and release the base member with respect to the tubular reception member.

A cylindrical hole 50 extends through each side of the base member. A battery 52 extends through each hole. A lens cap 54 is threadedly coupled to the rear face of the base member rearwardly of each hole to create a light chamber 56 rearward of each side of the base member. A battery switch 58 is threadedly coupled to the front face of the base member forwardly of each hole to energize and de-energize the battery upon depressing the switch.

Next a printed circuit board 62 is provided. The printed circuit board has rearward facing LEDs 64. Light emitting diodes are commonly referred to as LEDs. The LEDs are in a square grid within the chamber. The LEDs are adapted to be turned on and off through the energizing and de-energizing of the battery upon the pressing of the switch. The LEDs are at an elevation essentially equal to the ball for maximizing illumination.

Additionally, in the preferred embodiment, a laterally positioned link 68 is provided. The laterally positioned link extends laterally from and is pivotably secured to each side of the base member for supplemental attachment of the trailer.

Lastly, a television camera 72 is provided in one of the two chambers. One of the chambers includes the LEDs. The other chamber includes the television camera, centrally located, with peripheral LED lights. The television camera promotes safety by facilitating the viewing of rearward objects.

An alternate embodiment of the LED accessory system 100 of the present invention is illustrated in FIGS. 5 through 8. In this embodiment, the base member 104 has a square opening 106 extending there through for being received on a rearwardly extending reception member 108. The reception member in this embodiment is of the type to selectively receive and support a trailer hitch 110. The sides of the base member have bearing surfaces 112 for pivotal support to facilitate the selective reorienting of LED light from both sides of the base member.

Figure 9:
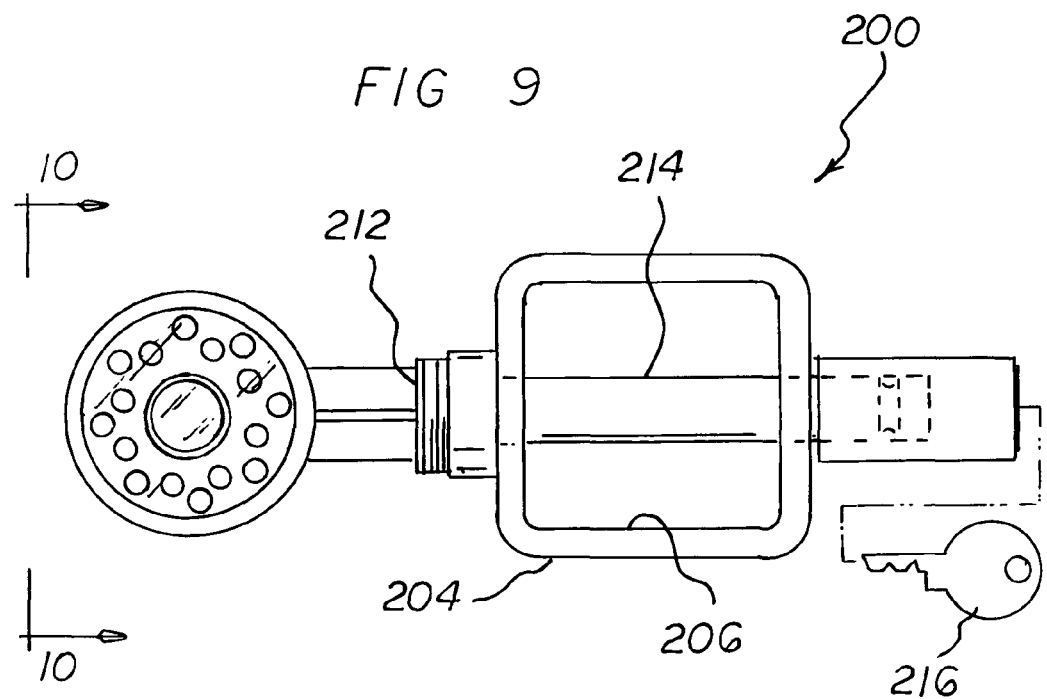
FIGS. 9 and 10 are a front elevational view of a second alternate embodiment of the invention and a side elevational view taken along line 10-10 of FIG. 9.
Figure 10:
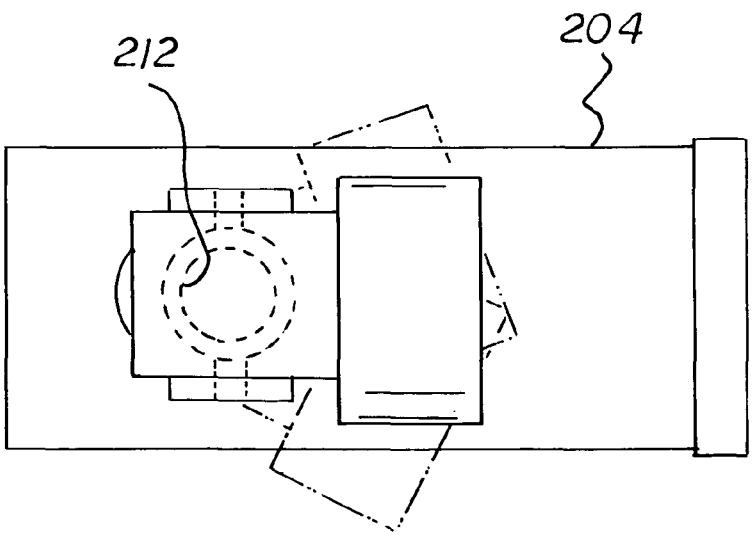

In a second alternate embodiment of the LED accessory system 200 of the present invention, as illustrated in FIGS. 9 and 10, the base member 204 has a square opening 206 extending there through for being received on a rearwardly extending reception member. The reception member is of the type to selectively receive and support a trailer hitch. One side of the base member in this embodiment has a bearing surface 212 for pivotal support to facilitate the selective reorienting of LED light from the base member. In this embodiment, the system further includes a pin 214 to secure the base member to the reception member and a key 216 to lock and unlock the pin with respect to the base member and the reception member.

Figure 11:
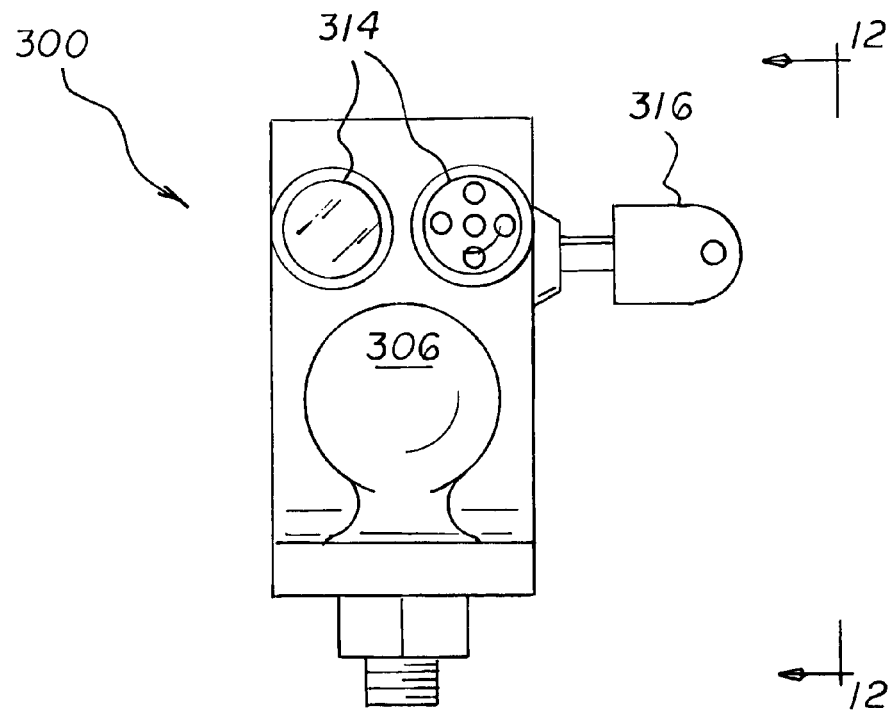
FIGS. 11 and 12 are a front elevational view of a third alternate embodiment of the invention and a side elevational view taken along line 12-12 of FIG. 11.
Figure 12:
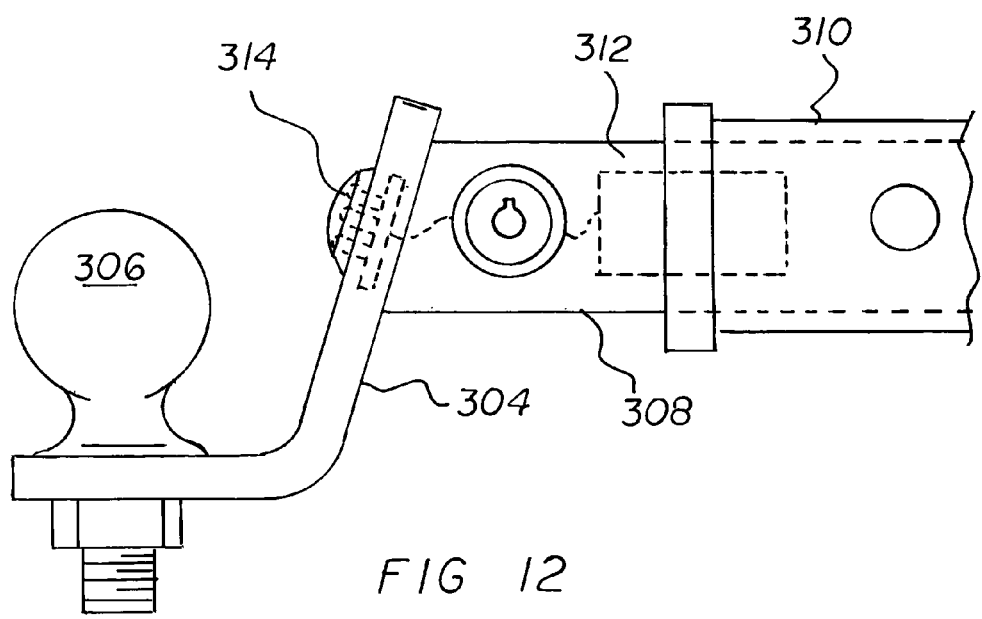

A third alternate embodiment of the system 300 of the present invention is illustrated in FIGS. 11 and 12. In this embodiment, the system further includes a trailer hitch 304 with a ball 306 rearwardly and a projection 308 forwardly. The system also includes a rearwardly extending reception member 310 of the type to selectively receive and support the trailer hitch. In this embodiment, the base member 312 is formed in the trailer hitch with two sets of LEDs 314 facing the ball. The system in this embodiment further includes a key 316 to activate and inactivate the LEDs.

Figure 13:
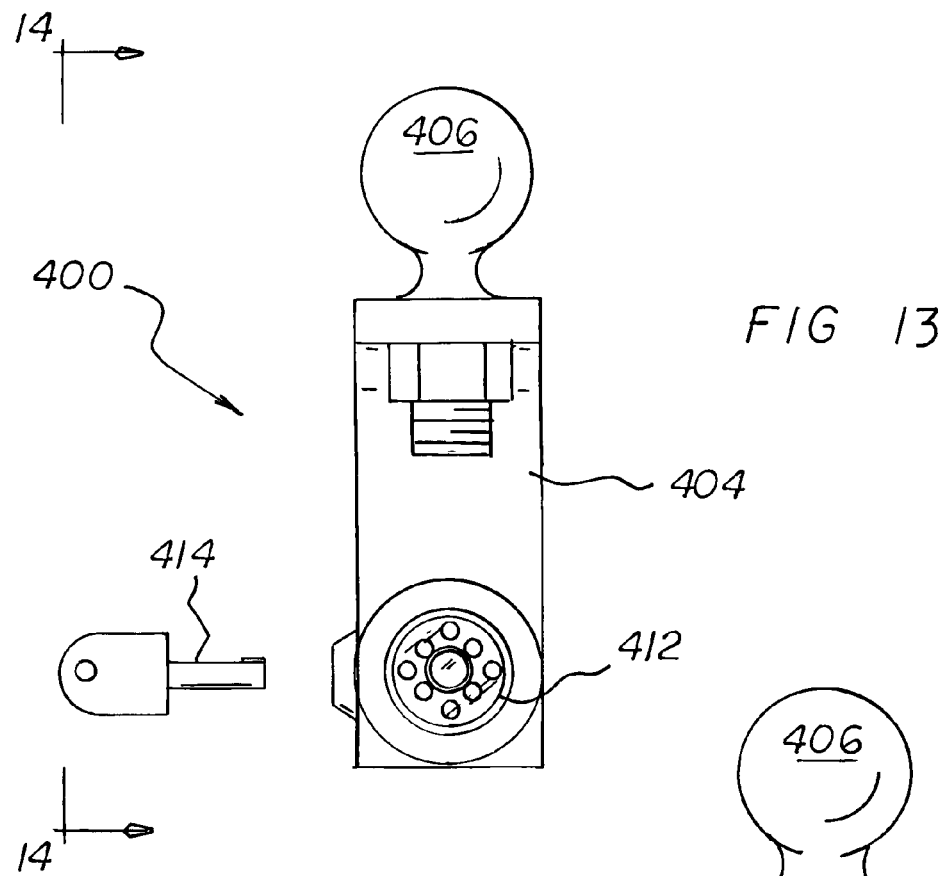
FIGS. 13 and 14 are a front elevational view of a fourth alternate embodiment of the invention and a side elevational view taken along line 14-14 of FIG. 13.
Figure 14:
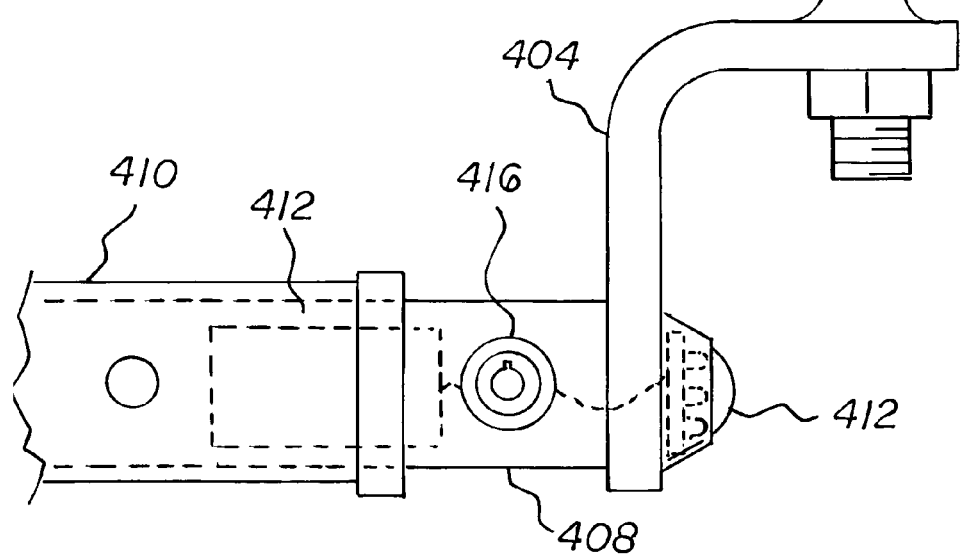

Note FIGS. 13 and 14 which illustrate a fourth alternate embodiment of the invention. In this embodiment, the system 400 further includes a trailer hitch 404 with a ball 406 rearwardly and a projection 408 forwardly. A rearwardly extending reception member 410 of the type to selectively receive and support the trailer hitch is also included. In this embodiment, the base member 412 is formed in the trailer hitch with one set of LEDs beneath the ball. Further in this embodiment, a key 414 is included to activate and inactivate the switch 416.

Figure 15:
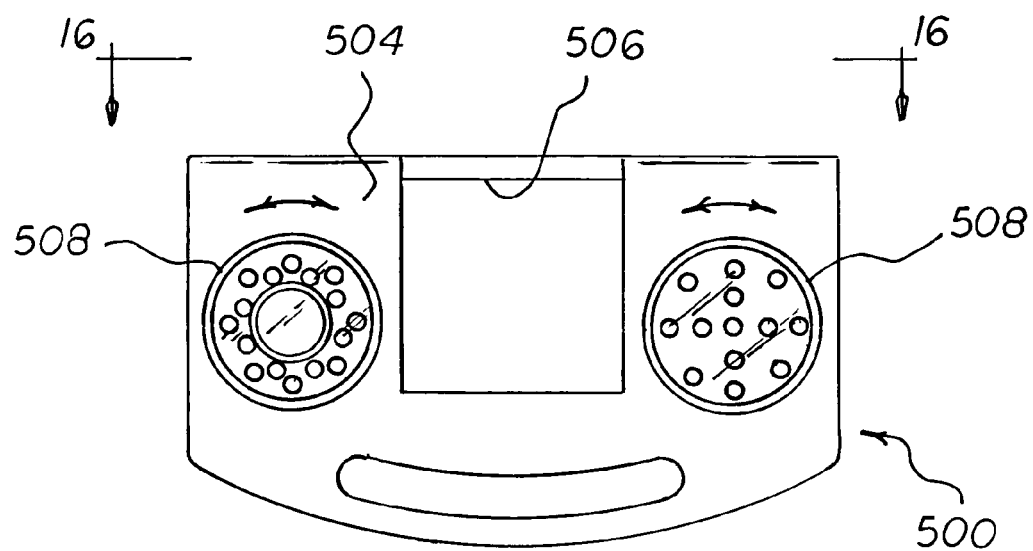
FIGS. 15 and 16 are a front elevational view of a fifth alternate embodiment of the invention and a plan view taken along line 15-15 of FIG. 15.
Figure 16:
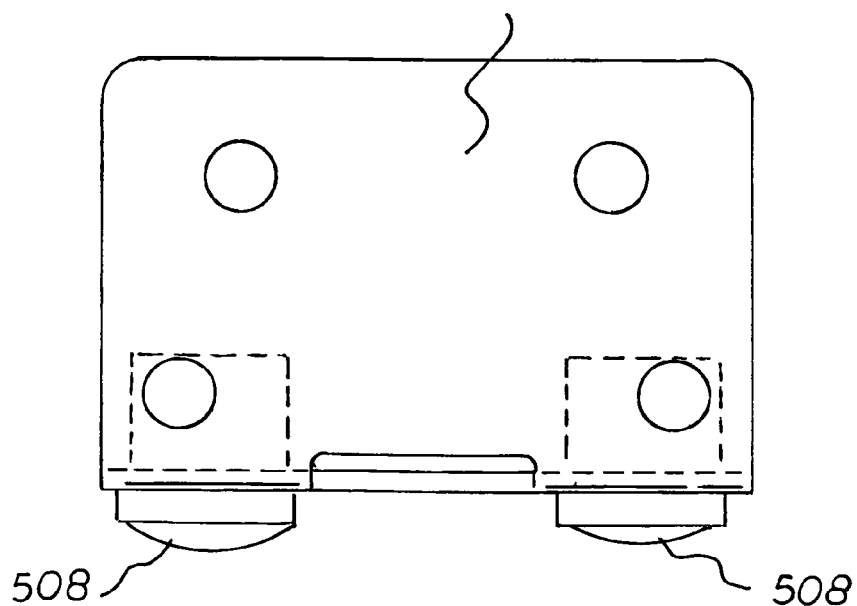

A fifth alternate embodiment of the system 500 of the present invention is shown in FIGS. 15 and 16. In this embodiment, the base member 504 has a square opening 506 extending there through for being received on a rearwardly extending reception member of the type to selectively receive and support a trailer hitch. In this embodiment, the sides of the base member have bearing surfaces 508 for rotational support to activate and inactivate the LEDs.

In a final embodiment of the invention, as shown in FIGS. 17 and 18, the base member 604 of the system 600 has laterally space openings 606 extending there through for being received on a license plate 608. In this final embodiment, the base member has bearing surfaces 612 for rotational support to facilitate the selective reorienting of LED light with respect to the base member.

Figure 5:
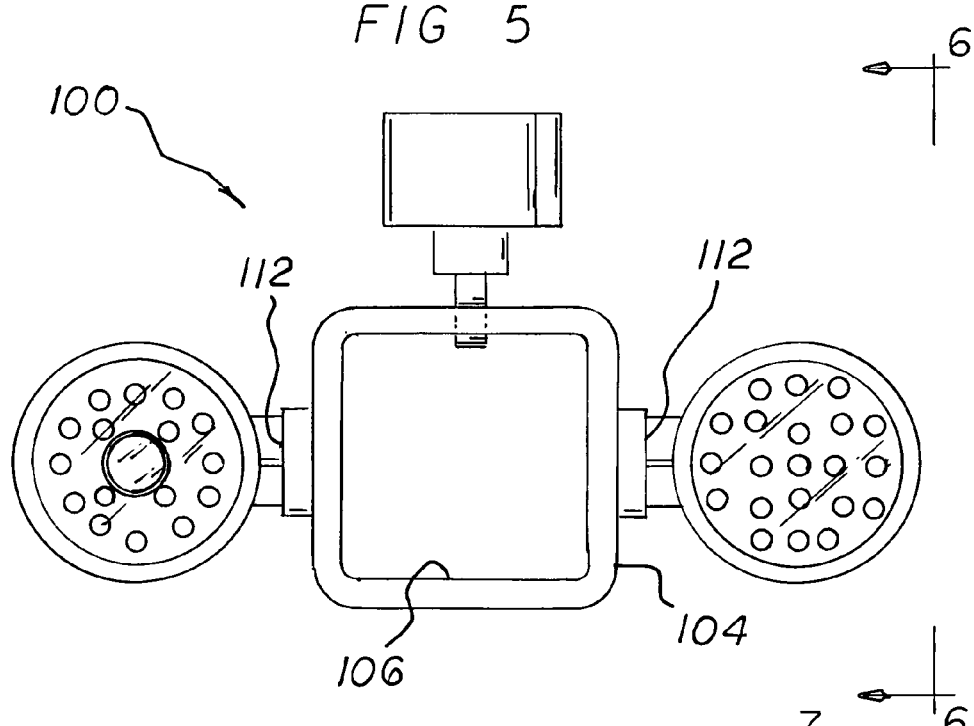
FIG. 5 is a front elevational view of a first alternate embodiment of the invention.
Figure 6:
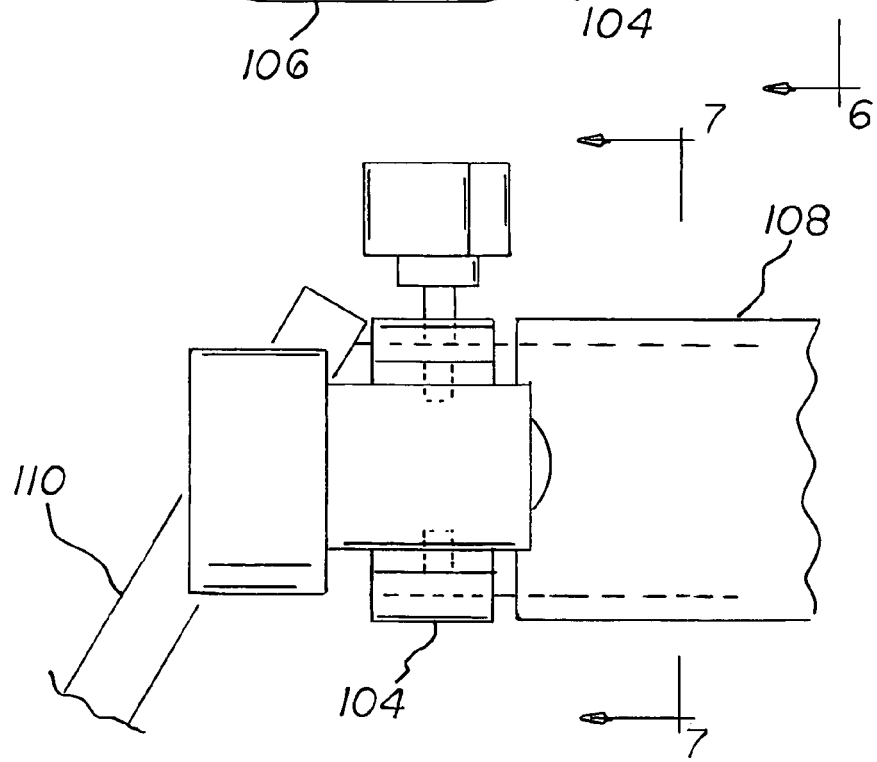
FIG. 6 is a side elevational view taken along line 6-6 of FIG. 5.
Figure 7:
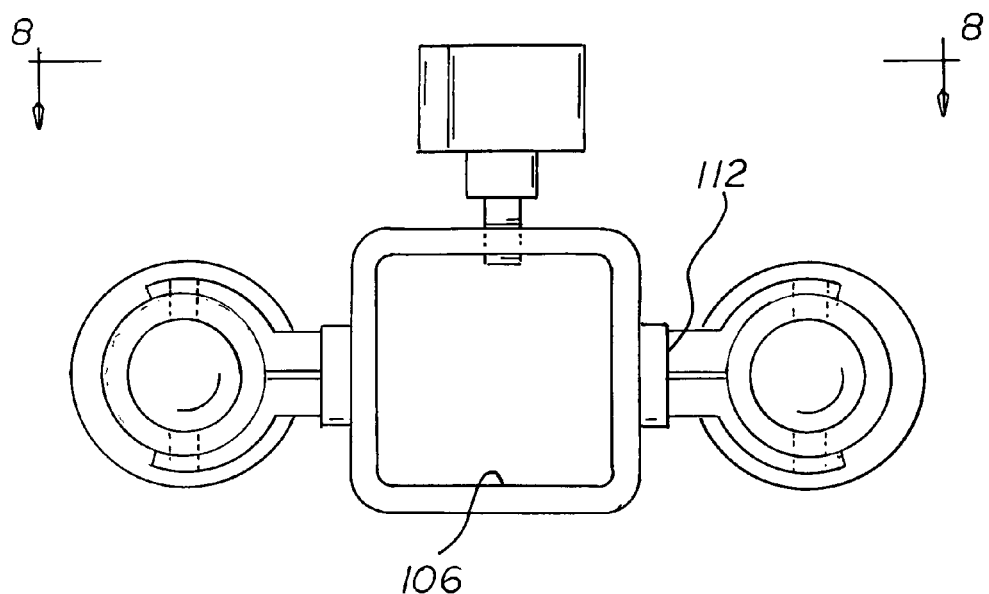
FIG. 7 is a rear elevational view taken along line 7-7 of FIG. 6.
Figure 8:
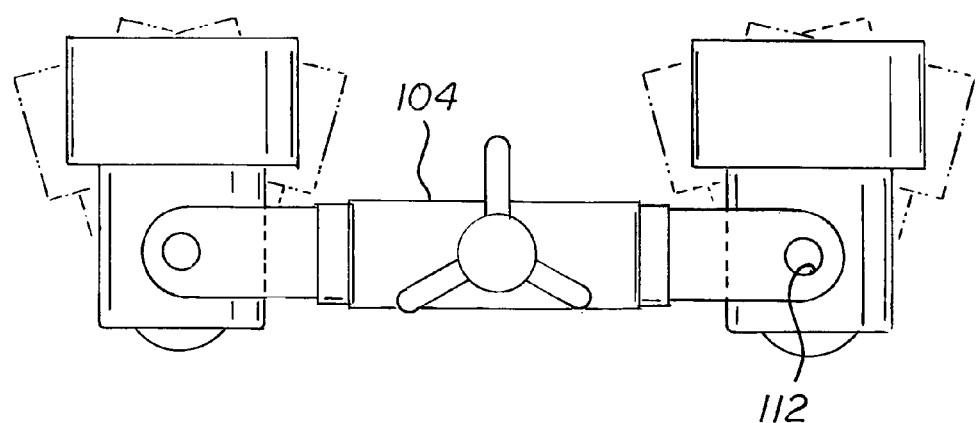
FIG. 8 is a plan view taken from above along line 8-8 of FIG. 7.

In each of the various alternate embodiments, a television camera 72 is provided in a chamber. In the embodiments of FIGS. 1, 5 and 15, one of two chambers includes the LEDs while the other chamber includes the television camera, centrally located, with peripheral LED lights. In the embodiments of FIGS. 9, 13 and 17, a single chamber includes the television camera, centrally located, with peripheral LED lights. Lastly, in the chamber of FIG. 11, one of two chambers includes the LEDs while the other chamber includes the television camera, centrally located, with no peripheral LED lights.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An LED accessory system comprising:
   a base member having a top and a bottom with laterally spaced sides, the base member having a generally planar front face and a generally planar rear face, the base member having an essentially square opening there through for being received on a rearwardly extending reception member, the reception member being of the type to selectively receive and support a trailer hitch;
   a cylindrical hole extending through the base member, the square opening and the cylindrical hole being co-planar with parallel axes, a battery extending through the hole, a lens cap threadedly coupled to the rear face of the base member rearwardly of the hole to create a light chamber rearward of the base member, a battery switch threadedly coupled to the base member; and
   a printed circuit board with rearward facing LEDs within the chamber, the LEDs adapted to be turned on and off through the energizing and de-energizing of the battery by the switch.

2. The system as set forth in claim 1 and further including a television camera in the chamber facing rearwardly to promote safety by facilitating the viewing of rearward objects.

3. An LED towing accessory system for illuminating a hitch ball area of a towing vehicle to facilitate coupling a trailer to the towing vehicle, the system comprising, in combination:
   a horizontally disposed tubular reception member having a square cross sectional configuration with an exterior surface and a rearwardly extending interior surface;
   a hitch ball member having a rearward end with an upstanding ball for receiving a trailer to be towed, the hitch ball member having a forward end with a forwardly extending projection positionable in the interior surface of the reception member;

a base member having a top and a bottom with laterally spaced sides, the base member having a generally planar front face and a generally planar rear face and a square opening through the base member, the opening being slidably received by the exterior surface of the tubular reception member with the rear face facing rearwardly toward the upstanding ball;

two angularly disposed threaded apertures extending from the top of the base member to the opening, a locking bolt threadedly received within each threaded aperture to selectively secure and release the base member with respect to the tubular reception member;

a cylindrical hole extending through each side of the base member, a battery extending through each hole, a lens cap threadedly coupled to the rear face of the base member rearwardly of each hole to create a light chamber rearward of each side of the base member, a battery switch threadedly coupled to the front face of the base member forwardly of each hole to energize and de-energize the battery upon depressing the switch;

a printed circuit board with rearward facing LEDs in a square grid within the chamber, the LEDs adapted to be turned on and off through the energizing and de-energizing of the battery upon the pressing of the switch, the LEDs being at an elevation essentially equal to the ball for maximizing illumination;

a laterally positioned link extending laterally from and pivotably secured to each side of the base member for supplemental attachment of the trailer; and a television camera within one of the chambers operatively coupled to the battery.

* * * * *